US007625982B2

(12) United States Patent
Martin et al.

(10) Patent No.: US 7,625,982 B2
(45) Date of Patent: *Dec. 1, 2009

(54) MULTIMODAL POLYETHYLENE COMPOSITIONS AND PIPE MADE FROM SAME

(75) Inventors: Joel L. Martin, Bartlesville, OK (US); Kumudini Jayarante, Bartlesville, OK (US); Matthew G. Thorn, Mason, OH (US); J. Todd Lanier, Bartlesville, OK (US); Max P. McDaniel, Bartlesville, OK (US); Qing Yang, Bartlesville, OK (US); Michael D. Jensen, Laurel, MD (US); Paul J. DesLauriers, Bartlesville, OK (US); Rajendra K. Krishnaswamy, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 135 days.

This patent is subject to a terminal disclaimer.

(21) Appl. No.: 11/264,900

(22) Filed: Nov. 2, 2005

(65) Prior Publication Data

US 2007/0043182 A1    Feb. 22, 2007

Related U.S. Application Data

(63) Continuation-in-part of application No. 11/209,006, filed on Aug. 22, 2005, now Pat. No. 7,312,283, and a continuation-in-part of application No. 11/208,077, filed on Sep. 15, 2005, now Pat. No. 7,226,886.

(51) Int. Cl.
*C08L 23/08* (2006.01)
*C08L 23/18* (2006.01)
*F16L 9/12* (2006.01)

(52) U.S. Cl. .......... 525/240; 526/348.5; 526/352.2; 428/36.9; 138/178

(58) Field of Classification Search .......... 526/352, 526/352.2, 113, 118, 160, 120, 943, 348; 428/35.7, 34.1, 36.9; 525/280, 240
See application file for complete search history.

(56) References Cited

U.S. PATENT DOCUMENTS

| | | | |
|---|---|---|---|
| 3,248,179 A | 4/1966 | Norwood | |
| 4,501,885 A | 2/1985 | Sherk et al. | |
| 4,588,790 A | 5/1986 | Jenkins, III et al. | |
| 4,939,217 A | 7/1990 | Stricklen | |
| 5,064,797 A | 11/1991 | Stricklen | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 5,719,241 A | 2/1998 | Razavi et al. | |
| 5,907,021 A | 5/1999 | Turner et al. | |
| 6,218,472 B1 * | 4/2001 | Debras et al. | 525/191 |
| 6,239,235 B1 | 5/2001 | Hottovy et al. | |
| 6,262,191 B1 | 7/2001 | Hottovy et al. | |
| 6,268,447 B1 | 7/2001 | Murray et al. | |
| 6,274,684 B1 | 8/2001 | Loveday et al. | |
| 6,346,575 B1 * | 2/2002 | Debras et al. | 525/191 |
| 6,462,161 B1 | 10/2002 | Cady et al. | |
| 6,489,263 B2 | 12/2002 | Murray et al. | |
| 6,833,415 B2 | 12/2004 | Kendrick et al. | |
| 6,878,454 B1 * | 4/2005 | Shannon et al. | 428/523 |
| 6,878,784 B1 | 4/2005 | Asumalahti et al. | |
| 6,904,940 B2 | 6/2005 | Scheelen et al. | |
| 7,064,225 B2 | 6/2006 | Thorn et al. | |
| 7,129,296 B2 * | 10/2006 | Van Dun et al. | 525/191 |
| 7,141,632 B2 | 11/2006 | Vaughan et al. | |
| 7,193,017 B2 * | 3/2007 | Kwalk | 525/191 |
| 2004/0034169 A1 * | 2/2004 | Zhou et al. | 525/240 |
| 2004/0132933 A1 | 7/2004 | Crowther et al. | |
| 2005/0153830 A1 | 7/2005 | Jensen et al. | |
| 2005/0154159 A1 * | 7/2005 | DesLauriers et al. | 526/156 |
| 2005/0245689 A1 * | 11/2005 | Krishnaswamy et al. | 525/240 |
| 2005/0288461 A1 | 12/2005 | Jensen et al. | |
| 2005/0288462 A1 | 12/2005 | Jensen et al. | |

FOREIGN PATENT DOCUMENTS

| | | | |
|---|---|---|---|
| EP | 1 201 711 A1 | | 5/2002 |
| EP | 1201711 A1 * | | 5/2002 |
| EP | 1359192 A1 | | 11/2003 |
| EP | 1 405 866 A1 | | 4/2004 |
| WO | WO 01/25328 A1 | | 4/2001 |
| WO | WO 01/25328 A1 * | | 4/2001 |
| WO | WO 03/008468 A2 | | 1/2003 |
| WO | WO 03/020821 A1 * | | 3/2003 |
| WO | WO 03/037941 A1 | | 5/2003 |
| WO | WO 2005/108484 A1 | | 11/2005 |
| WO | WO 2007/024773 A1 | | 3/2007 |

OTHER PUBLICATIONS

"Engineering Properties of Polyethylene," The Plastics Pipe Institute, Inc., Chapter 3, pp. 47-106.

(Continued)

*Primary Examiner*—David Wu
*Assistant Examiner*—Rip A. Lee
(74) *Attorney, Agent, or Firm*—Conely Rose, P.C.; Rodney B. Carroll; Cheryl L. Huseman (57) ABSTRACT

A multimodal polyethylene composition having at least two polyethylene components, wherein each component has a molecular weight distribution of equal to or less than about 5, one component has a higher molecular weight than the other component, and the higher molecular weight component has an "a" parameter value of equal to or greater than about 0.35 when fitted to the Carreau-Yasuda equation with n=0.

14 Claims, 1 Drawing Sheet

OTHER PUBLICATIONS

Bird, R. Byron, et al., "Dynamics of Polymeric Liquids," A Wiley-Interscience Publication, vol. 1—Fluid Mechanics, Second Edition, 1987, 10 pgs.

Hieber, C.A., et al., "Some correlations involving the shear viscosity of polystyrene melts," Rheologica Acta, vol. 28, No. 4, 1989, pgs. 321-332.

Hieber, C.A., et al., "Shear-Rate-Dependence Modeling of Polymer Melt Viscosity," Polymer Engineering and Science, vol. 32, No. 14, Jul. 1992, pgs. 931-938.

Patent application entitled "Polymerization Catalysts and Process for Producing Bimodal Polymers in a Single Reactor," filed Aug. 22, 2005, as U.S. Appl. No. 11/209,006.

Patent application entitled Polymerization Catalysts and Process for Producing Bimodal Polymers in a Single Reactor, filed Aug. 19, 2005, as U.S. Appl. No. 11/208,077.

Bubeck, R.A., "Structure-property relationships in metallocene polythylenes", Materials Science and Engineering R, vol. 39, No. 1, Sep. 15, 2002, pp. 1-28.

Search Report and Written Opinion, PCT/US06/042526, Mar. 20, 2007, 14 pgs.

Janzen, Jay, et al., "Rheological Detection of Long-Chain Branching in High-Density Polyethylenes," Pennsylvania State University—Phllips Petroleum Company Research Center, pp. 128-129.

Arnett, Raymond L., et al., "Effect of Side Groups on Unperturbed Chain Dimensions of Atactic Hydrocarbon Polymers," The Journal of Physical Chemistry, vol. 77, No. 16, 1973, pp. 1986-1989.

Arnett, Raymond L., et al., "Zero-Shear Viscosity of Some Ethyl Branched Paraffinic Model Polymers," The Journal of Physical Chemistry, American Chemical Society, vol. 84, No. 6, 1980, pp. 649-652.

Randall, James C., "NMR and Macromolecules—Sequence, Dynamic, and Domain Structure," ACS Symposium Series 247, American Chemical Society, 1984, 4 pgs.

Kajigaeshi, Shoji, et al., "Selective Preparation of Fluorene Derivatives Using the t-Butyl Function as a Positional Protective Group," The Chemical Society of Japan, vol. 59. No. 1, Jan. 1986, pp. 97-103.

Janzen, J., et al., "Diagnosing long-chain branching in polyethylenes," Journal of Molecular Structure, 1999, pp. 569-584 and 4 pgs.

Beigzadeh, Daryoosh, at al., "Combined metallocene catalysts: an efficient technique to manipulate long-chain branching frequency of polyethylene," Macromol. Rapid Commun., vol. 20, No. 10, 1999, pp. 541-545.

Walter, Philipp, et al., "Short and long chain branching of polyethene prepared by means of ethene polymerization with 1-elcosene using MAO activated Me2Si(Me4Cp)(NtBu)TICI2," Macromolecular Chemistry and Physics, vol. 201, No. 5, 2000, pp. 604-612.

Nele, Marcio, et al., "Retrofitting of Industrial Olefin Polymerization Plants: Producing Broad MWDs Through Multiobjective Periodic Operation," Journal of Applied Polymer Science, vol. 77, 2000, pp. 437-452.

Jordens, K., et al., "The influence of molecular weight and thermal history on the thermal, rheological, and mechanical properties of metallocene-catalyzed linear polyethylenes," Polymer, Elsevier Science, vol. 41, 2000, 7175-7192.

Sandstrum, Steve D., et al., "Relevance of ISO 9080 standard grows with HDPE gas pipe lines," Pipe Line & Gas Industry, Dec. 2000, pp. 55-58.

Hubert, L., et al., "Physical and mechanical properties of polyethylene for pipes in relation to molecular architecture I. Microstructure and crystallisation kinetics," Polymer, Elsevier Science, vol. 42, 2001, pp. 8425-8434.

Reb, Alexander, et al., "Diastereomeric amido functionalized ansa half-sandwich complexes of titanium and zirconium as catalyst precursors for ethylene polymerization to give resins with bimodal molecular weight distributions," Journal of Molecular Catalysis A: Chemical, Elsevier Science, vol. 174, 2001, pp. 35-49.

Aguilar, M., et al., "New aspects on the rheological behavior of metallocene catalysed polyethylenes," Polymer, Elsevier Science, vol. 42, 2001, pp. 9713-9721.

Robertson, Christopher G., et al., "Extent of Branching from Linear Viscoelasticity of Long-Chain-Branched Polymers," Journal of Polymer Science: Part B: Polymer Physics, vol. 42, 2004, pp. 1671-1684.

Joseph, Sebastian, Ph.D., "Bimodal polyethylene advantages in pressure pipe applications," Lyondell Chemical Company, International Polyolefins Conference in Houston, Feb. 28, 2006, 21 pgs.

* cited by examiner

MULTIMODAL POLYETHYLENE COMPOSITIONS AND PIPE MADE FROM SAME

CROSS-REFERENCE TO RELATED APPLICATIONS

This is a Continuation-In-Part Application of U.S. patent application Ser. No. 11/209,006, filed Aug. 22, 2005, now U.S. Pat. No. 7,312,283 and entitled "Polymerization Catalysts and Process for Producing Bimodal Polymers in a Single Reactor" and a Continuation-In-Part Application of U.S. patent application Ser. No. 11/208,077, filed Sep. 15, 2005 now U.S. Pat. No. 7,226,886, issued on Jun. 5, 2007 and entitled "Polymerization Catalysts and Process for Producing Bimodal Polymers in a Single Reactor."

FIELD OF THE INVENTION

The present disclosure relates to multimodal polyethylene compositions and pipe made from same, more specifically to bimodal polyethylene compositions for manufacture of high pressure rated pipe.

BACKGROUND OF THE INVENTION

Polymeric pipes have replaced metal pipes in many applications such as high-pressure fluid transportation. Polymeric pipes have several advantages over metal pipes including being of relatively lighter weight, more corrosion resistant, inexpensive, more thermally and electrically insulative, tougher, more durable and more easily shaped during manufacture. Such pipes are exposed to numerous stresses during their lifetime that may result in cracks or breaks that are expensive to repair, especially in situations where the pipe is buried in a structure or underground. As such polymeric pipes may be required to meet industry-defined standards depending on their intended use. Polymeric material used in the fabrication of pipe has often been optimized to provide a more durable end-use article.

Polyethylene compounds are known for the production of pipes for the transport of fluids under pressure. Such pipes may require high stiffness, combined with a high resistance against slow crack growth as well as resistance to crack propagation yielding impact toughness. Polyethylene pipes are widely used as they are lightweight and can be easily assembled by fusion welding. The polyethylene pipes made of these polyethylene compounds usually have a good resistance to stress cracking. However, when these pipes are embedded in or posed on a soil comprising rocks and stones, scratching of the pipes can occur giving rise to crack growth. Moreover, point loads on the pipeline can occur by rock impingement and also give rise to crack growth.

Thus there is a need for improved polymeric compositions and methods of fabricating polymeric pipe.

SUMMARY OF THE INVENTION

Disclosed herein is a multimodal polyethylene composition having at least two polyethylene components, wherein each component has a molecular weight distribution of equal to or less than about 5, one component has a higher molecular weight than the other component, and the higher molecular weight component has an "a" parameter value of equal to or greater than about 0.35 when fitted to the Carreau-Yasuda equation with n=0.

DETAILED DESCRIPTION

Disclosed herein are multimodal polyethylene (PE) compositions, PE pipes, and methods of making same. Such methods may comprise preparing a multimodal PE composition and forming the composition into a pipe. The multimodal PE composition may comprise a PE base resin and optionally additives or modifiers. In an aspect, the multimodal PE composition comprises a bimodal PE resin and the pipe prepared therefrom may display mechanical properties sufficient to warrant the classification PE-100.

The PE base resin may be a multimodal resin. Herein, the "modality" of a polymer resin refers to the form of its molecular weight distribution curve, i.e. the appearance of the graph of the polymer weight fraction as a function of its molecular weight. The polymer weight fraction refers to the weight fraction of molecules of a given size. A polymer having a molecular weight distribution curve showing a single peak may be referred to as a unimodal polymer, a polymer having curve showing two distinct peaks may be referred to as bimodal polymer, a polymer having a curve showing three distinct peaks may be referred to as trimodal polymer, etc. Polymers having molecular weight distribution curves showing more than one peak may be collectively referred to as multimodal polymers or resins.

A polymer resin may have two or more components that may be distinguishable from one another, for example based upon their individual composition and/or molecular weight distribution. A molecular weight distribution curve may be prepared for each individual component of the polymer resin. For example, the molecular weight distribution curve for the individual components of the polymer resin may display a single peak and thus be unimodal. The molecular weight distribution curves for the individual components may be superimposed onto a common chart to form the weight distribution curve for the polymer resin as a whole. Upon such superimposition, the resultant curve for the polymer resin as a whole may be multimodal or show n distinct peaks corresponding to n polymer components of differing molecular weight distributions. For example, a bimodal polymer resin may show two distinct peaks corresponding to two individual components. For example, a bimodal polymer resin may have a first component that may be generally characterized as a higher molecular weight polymer component and a second component that may be generally characterized as a lower molecular weight polymer component. A trimodal polymer composition may show three distinct peaks corresponding to three individual polymer components. Alternatively, superimposition of the molecular weight distribution curves from the individual components may show a single peak that is broadened in comparison with the curves for the individual components corresponding to polymer fractions having different but overlapping molecular weight distributions. In an aspect, the multimodal PE composition comprises a bimodal PE base resin and is referred to as a bimodal polyethylene composition (BPEC). The remainder of the discussion will focus on a BPEC with the understanding that other polymeric compositions, for example having different modality, may be employed in various aspects and embodiments as would be apparent to one skilled in the art.

The individual components of the BPEC may comprise a homopolymer, a copolymer, or blends thereof. In an aspect, the components of the BPEC may be a copolymer comprised of a polymer of ethylene with one or more comonomers such as alpha olefins. In an aspect, the BPEC comprises a higher molecular weight ethylene/1-olefin copolymer (HMW) component and a lower molecular weight ethylene/1-olefin copolymer (LMW) component. The comonomer of the HMW component of the BPEC may be the same as or different from the comonomer of the LMW component. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an aspect, the comonomer for the LMW component and HMW component of the BPEC is 1-hexene. In an aspect, the amount of comonomer in the HMW component of the BPEC is equal to or greater than about 1.5 times that in the LMW component, each being expressed as the number of short chain branches (SCB) per 1,000 total carbons. Methods for the determination of SCB are described in more detail herein.

Such BPECs may be prepared by any means known to one skilled in art, for example by employing a multi-catalyst system or by varying the comonomers in the polymerization reaction as will be described in more detail herein. Such BPECs may have a variety of properties and parameters described below either singularly or in combination. The specific methods for determination of these properties and parameters are described in detail herein in the Examples section.

The BPEC may be characterized by the weight ratio of the components thereof. The BPEC having a HMW component and a LMW component may have a HMW to LMW component ratio of equal to or greater than about 0.5, alternatively equal to or greater than about 1.0, alternatively equal to or greater than about 2. In an aspect, the HMW to LMW component ratio is equal to or greater than 0.5 and equal to or less than about 2.

The BPEC may be further characterized by the degree of branching present in the individual components and/or in the composition as a whole. Short chain branching (SCB) is known for its effects on polymer properties such as stiffness, tensile properties, heat resistance, hardness, permeation resistance, shrinkage, creep resistance, transparency, stress crack resistance, flexibility, impact strength, and the solid state properties of semi-crystalline polymers such as polyethylene, while long chain branching (LCB) exerts its effects on polymer rheology. The HMW component of the BPEC may contain equal to or less than about one long chain branch (LCB) per about 10,000 total carbon atoms (about 1/10,000), alternatively equal to or less than about one LCB per about 100,000 total carbon atoms (about 1/100,000), or alternatively equal to or less than about one LCB per about 1,000,000 total carbon atoms (about 1/1,000,000).

The BPEC composition as a whole may have a ratio of SCB in the HMW component to SCB in the LMW component, referred to as SCB segregation ratio, of equal to or greater than about 1, alternatively equal to or greater than about 1.5, or alternatively equal to or greater than about 2.

The molecular weight distribution (MWD) of the BPEC may be characterized by the ratio of the weight average molecular weight to the number average molecular weight, which is also referred to as the polydispersity index (PDI) or more simply as polydispersity. The number average molecular weight is the common average of the molecular weights of the individual polymers calculated by measuring the molecular weight of n polymer molecules, summing the weights, and dividing by n. The weight average molecular weight describes the molecular weight distribution of a polymer composition and is calculated according to equation 1:

$$M_n = \frac{\Sigma_i N_i M_i^2}{\Sigma_i N_i M_i} \quad (1)$$

where $N_i$ is the number of molecules of molecular weight $M_i$. All molecular weight averages are expressed in gram per mole (g/mol).

The individual components of the BPEC (e.g., the LMW component and the HMW component) may have narrow molecular weight distributions (MWD). More specifically, the HMW component may have a PDI of equal to or less than about 5, alternatively equal to or less than about 4, alternatively equal to or less than about 3.5, or alternatively, equal to or less than about 3. The LMW component may have a PDI of equal to or less than about 6, alternatively equal to or less than about 5, alternatively equal to or less than about 4, or alternatively, equal to or less than about 3. The resultant BPEC composition (i.e. including both the LMW and HMW components) may have a broad MWD of equal to or greater than about 6, alternatively equal to or greater than about 10, or alternatively equal to or greater than about 15. The weight average molecular weight, $M_w$, of the HMW component may be at equal to or greater than about 9, 10, 15, or 20 times the $M_w$ of the LMW component. In an aspect, the $M_w$ of the HMW component is about 15 times the $M_w$ of the LMW component.

The BPEC may be further characterized as having a limited rheological breadth. The HMW component of the bimodal composition may have "a" parameter values of equal to or greater than about 0.35, or alternatively equal to or greater than about 0.4 when the rheology data is fitted to the CY equation with n=0, indicating the limit of their rheological breadths. An increasing value of the CY "a" parameter indicates a narrowing of the rheological breadth of the resin.

Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the following equation:

$$E = E_o [1 + (T_\xi \dot\gamma)^a]^{\frac{n-1}{a}}$$

where
E=viscosity (Pa·s)
$\dot\gamma$=shear rate (1/s)
a=rheological breadth parameter
$T_\xi$=relaxation time (s) [describes the location in time of the transition region]
$E_O$=zero shear viscosity (Pa·s) [defines the Newtonian plateau]
n=power law constant [defines the final slope of the high shear rate region]

To facilitate model fitting, the power law constant is held at a constant value. Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987), each of which is incorporated by reference herein in its entirety.

The BPEC may exhibit a broad rheological breadth even when the polymers have low high load melt index (HLMI) values. The HLMI represents the rate of flow of a molten resin through an orifice of 0.0825 inch diameter when subjected to a force of 21,600 grams at 190° C. as determined in accordance with ASTM D 1238. The BPEC may have a HLMI of equal to or less than about 30, alternatively equal to or less than about 20, or alternatively equal to or less than about 15.

The BPECs of this disclosure may be further characterized by having a density of from about 0.920 g/cc to about 0.965 g/cc, alternatively from about 0.940 g/cc to about 0.96 g/cc, alternatively from about 0.945 g/cc to about 0.955 g/cc. The density may be determined in accordance with ASTM D 1505.

In an aspect, a BPEC of this disclosure may display an HLMI of from about 0.5 to about 25 g/10 min, a polymer density of from about 0.920 to about 0.965 g/cc, and a polydispersity index of from about 3.0 to about 30. The BPEC may be characterized further by a weight average molecular weight greater than about 50,000 g/mol.

In another aspect, a BPEC of this disclosure may display a HLMI of from about 3.0 to about 15 g/10 min, a polymer density of from about 0.935 to about 0.960 g/cc, and a polydispersity index of from about 5.0 to about 30. The BPEC may be characterized further by a weight average molecular weight greater than about 150,000 g/mol.

In another aspect, a BPEC of this disclosure may display a HLMI of from about 4.0 to about 10 g/10 min, a polymer density of from about 0.940 to about 0.955 g/cc, and a polydispersity index of from about 6.0 to about 25. The BPEC may be characterized further by a weight average molecular weight greater than about 200,000 g/mol.

The BPEC of the present invention can be polymerized by any olefin polymerization method known in the art, using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the invention, the polymerization reactor system may comprise at least one loop slurry reactor. Such reactors are known in the art and may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), which is well known in the art is disclosed, for example, in U.S. Pat. Nos. 3,248,179, 4,501, 885, 5,565,175, 5,575,979, 6,239,235, 6,262,191 and 6,833, 415, each of which is incorporated by reference in its entirety herein.

Suitable diluents used in slurry polymerization are well known in the art and include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4588,790 and 5,436, 304, each of which is incorporated by reference in its entirety herein.

According to still another aspect of the invention, a high pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and Theological measurements.

The concentrations of monomer, co-monomer, hydrogen, co-catalyst, modifiers, and electron donors are important in producing these resin properties. Comonomer is used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Any catalyst composition capable of producing a BPEC may be employed in the production of the BPEC. For example, a catalyst composition for the production of a BPBC may include at least two metallocenes. The first metallocene may be used to produce the HMW component, and may be a tightly bridged metallocene containing a substituent that includes a terminal olefin. The second metallocene, that may be used to produce the LMW component, is generally not bridged and is more responsive to chain termination reagents, such as hydrogen, than the first metallocene. The metallocenes may be combined with a solid activator, an aluminum alkyl compound, an olefin monomer, and an olefin comonomer to produce the desired bimodal polyolefin. The activity and the productivity of the catalyst may be relatively high. As used herein, the activity refers to the grams of polymer produced per gram of solid catalyst charged per hour, and the productivity refers to the grams of polymer produced per gram of solid catalyst charged. Such catalysts are disclosed in U.S. patent application Ser. No. 11/209,006, filed Aug. 22, 2005, published as U.S. 2007-0043176 A1 and entitled "Polymerization Catalysts And Process For Producing Bimodal Polymers In A Single Reactor," and U.S. patent application Ser. No. 11/208,077, now U.S. Pat. No. 7,226,886, issued on Jun. 5, 2007 and entitled "Polymerization Catalysts and Process for Producing Bimodal Polymers in a Single Reactor," each of which is incorporated herein in its entirety.

The BPEC and/or the base PE resin may include other additives as known to those skilled in the art. Examples of additives include, but are not limited to, antistatic agents, colorants, stabilizers, nucleators, surface modifiers, pigments, slip agents, antiblocks, tackafiers, polymer processing aids and combinations thereof. In an aspect, the polymeric composition comprises carbon black. Such additives may be used singularly or in combination and may be included in the polymer composition before, during or after preparation of the BPEC as described herein. Such additives may be added via known techniques, for example during an extrusion or compounding step such as during pelletization or subsequent processing into an end use article. BPECs as described herein may be formed into various articles, including but not limited to, household containers, utensils, film products, drums, fuel tanks, pipes, geomembranes, and liners.

In an aspect, the BPEC of this disclosure is fabricated into a pipe by a plastics shaping process such as extrusion. A method of making a polymeric pipe comprises extruding the polymer or copolymer in a molten state through a die to form the polymeric pipe and cooling the pipe.

Pipe extrusion in the simplest terms is performed by melting, conveying polyethylene pellets into a particular shape (generally an annular shape), and solidifying that shape during a cooling process. There are numerous steps to pipe extrusion as provided below. The polymer feedstock can either be a pre-pigmented polyethylene resin or it can be a mixture of natural polyethylene and color concentrate (referred to as "Salt and Pepper blends"). In North America, the most common feedstock for pipe extrusion is "Salt and Pepper blends". In Europe and other areas of the world, the most common feedstock for pipe extrusion is pre-pigmented polyethylene resin. Feedstock is rigidly controlled to obtain the proper finished product (pipe) and ultimate consumer specifications.

The feedstock is then fed into an extruder. The most common extruder system for pipe production is a single-screw extruder. The purpose of the extruder is to melt, convey, and homogenize the polyethylene pellets. Extrusion temperatures typically range from 178° C. to 250° C. depending upon the extruder screw design and flow properties of the polyethylene.

The molten polymer is then passed through a die. The die distributes the homogenous polyethylene polymer melt around a solid mandrel, which forms it into an annular shape. Adjustments can be made at the die exit to try to compensate for polymer sag through the rest of the process. In order for the pipe to meet the proper dimensional parameters, the pipe is then sized. There are two methods for sizing: vacuum or pressure. Both employ different techniques and different equipment.

Next, the pipe is cooled and solidified in the desired dimensions. Cooling is accomplished by the use of several water tanks where the outside pipe is either submerged or water is sprayed on the pipe exterior. The pipe is cooled from the outside surface to the inside surface. The interior wall and inside surfaces of the pipe can stay very hot for a long period of time, as polyethylene is a poor conductor of heat. Finally, the pipe is printed and either coiled or cut to length.

In an aspect, the polymeric pipe fabricated from BPECs of this disclosure display enhanced mechanical properties such as resistance to slow crack growth and rapid crack propagation (RCP), and strength sufficient to warrant the designation PE100. Such pipes may display the properties described below either singularly or in combination. The specific methods for determination of these properties are described in more detail herein.

The Small-Scale Steady-State (S4) test is the current standard for measuring the RCP resistance of polyethylene pipes. In the S4 test, the pipe specimens are seven diameters long and are sealed at both ends and pressurized with air. Typically, pipe specimens are conditioned externally at the test temperature, and then moved to the S4 rig for testing. A sharp chisel-edged striker impacts the pipe at one end and drives a fast-running crack through the main section of the pipe. While the crack propagates, internal disc baffles spaced along the pipe length suppress axial decompression ahead of it, so that the pressure at the crack-tip is approximately equal to the test pressure during the entire course of crack growth. This promotes steady-state crack growth. Further, in the S4 test, a containment cage around the specimen prevents flaring of the pipe. This also limits the failure mode to steady-state crack propagation while minimizing ductile transient bursting. The S4 test details and procedures are described in the ISO 13477 standard. The test can be performed at a fixed temperature to determine the critical pressure ($P_c$) required to sustain RCP. Alternatively, a series of tests at a given/fixed operating pressure (usually 5 bars) and at various temperatures can be used to measure the critical temperature ($T_c$) for RCP to be sustained. Generally speaking, the temperature of a pipe must be below a critical limit even for RCP to be initiated. Once RCP is initiated, the pressure within the pipe must exceed a critical value to sustain steady state crack propagation. Therefore, for a pipe, low S4 $T_c$ and high S4 $P_c$ will help minimize RCP failures.

The lower the S4 critical temperature the better, since it results in a broader end-use temperature range for the pipe. A pipe fabricated from the BPECs disclosed herein, having an 8-inch nominal outer diameter with a standard diameter ratio (SDR=OD/t, where t=wall thickness) of about 11, may have a critical temperature value determined according to ISO DIS 13477 (S4 test) of equal to or less than about −15° C., alternatively equal to or less than about −20° C., alternatively equal to or less than about −25° C.

A modified Charpy impact test, referred to as the Razor-Notched Charpy Impact Test, has emerged as a useful indicator of the resistance to RCP fractures. This modified Charpy test is described in detail in ASTM F 2231. This test involves measuring the impact energy when a thin molded rectangular plaque (with a razor notch) is impacted by a swinging pendulum. This test can be performed at multiple temperatures; enabling one to determine the temperature at which the failure mode changes from ductile to brittle. The results from this test are as follows: (i) impact energy (in Joules) at room temperature and (ii) the lowest temperature at which the failure was clearly ductile (hinge break with an impact energy>0.15 J); for convenience, this temperature will be referred to as the Charpy ductile to brittle critical temperature, Charpy $T_{db}$. Generally speaking, a higher room-temperature impact energy and a lower Charpy $T_{db}$ means the ensuing pipe will have better RCP resistance.

The BPECs disclosed herein may have a Charpy $T_{db}$ less than about −25° C. and a room-temp impact energy greater than about 0.7 J; alternatively, the Charpy $T_{db}$ less than about −25° C. and a room-temp impact energy greater than about 0.8 J; alternatively, the Charpy $T_{db}$ may be less than about −30° C. and the room-temp impact energy greater than about 1.0 J; or alternatively, the Charpy $T_{db}$ may be less than about −35° C. and the room-temp impact energy greater than about 1.5 J.

A majority of the field failures in pressure pipe (gas transport) applications are attributable to a brittle fracture mode referred to as slow crack growth (SCG). This has led to the development of many lab-scale tests, such as the Pennsylvania Edge-Notch Tensile Test (PENT; ASTM F 1473) and the Full Notch Creep Test (FNCT; ISO 16770.3), to predict the resistance to SCG of various polyethylenes. In the PENT test, rectangular bars notched (to ensure brittle fracture) are subjected to a constant load at 80° C. until they finally break. The time to failure is recorded and is generally thought to be reflective of the SCG resistance of the polymer. The BPECs disclosed herein may display high PENT values of greater than about 1500 hours, alternatively greater than about 1900 hours. In an aspect, the BPECs disclosed herein may display high PENT values of greater than about 500 hours for the density range 0.948-0.952 g/cc.

HDPE pipes used for gas transport are under pressure for the duration of their useful service. Often, fluctuations in pressure render the load to be dynamic. Therefore, it is important to establish the maximum load that such a pipe can withstand without deformation and damage over the expected lifetime (typically, many decades). The design stress and the useful service lifetime of HDPE pipes are typically estimated by performing creep rupture tests at multiple temperatures. In this test (ASTM D 1598), the pipe of interest is subjected to a certain hydrostatic pressure (expressed as hoop stress) and the failure time is recorded. Failure is defined as a continuous loss of pressure (leakage) from within the pipe. Typically, a log-log plot of pipe hoop stress versus failure time is constructed and extrapolated to a desired lifetime. The corresponding hoop stress at the desired lifetime and temperature from the above-mentioned plot is used as the design stress (after the application of an appropriate safety factor) for the application of interest.

In order to predict the design stress and durability of such pressure pipes, accelerated testing is conducted at elevated temperatures. In other words, for a given pipe and hoop stress level, failure occurs at shorter times with increasing temperature. The general procedure to estimate the design stress and durability of HDPE pipes requires creep rupture failure data spread uniformly over a two-year timeframe at the end-use temperature (usually room temperature) and at two or three higher temperatures (typically in the 40-80° C. range). Subsequently, principles of time-temperature superposition are applied to the data, which allows one to reasonably extrapolate the failure data at room temperature to a few decades.

The design stress of a plastic pipe is often referred to as its long-term hydrostatic strength (LTHS) or the minimum required strength (MRS). LTHS, estimated using ASTM D 2837 (USA standard), is the estimated tensile stress in the wall of a pipe in the circumferential orientation which, when applied continuously, will cause failure of the pipe at 100,000 hours. The MRS of a pipe, estimated using the ISO 9080 standard, is the functional equivalent of the LTHS (with a desired lifetime of 50 years) used internationally. The LTHS and/or MRS of a pipe are used to certify gas pipes according to either ASTM D 2513 and/or ISO 4437. In other words, these values determine the maximum load that such pipes can bear during their utilization for the transportation of natural gas. In an aspect, the BPECs disclosed herein may be fabricated into pipe having a LTHS of equal to or greater than 1000 hours per ASTM D 2513.

An MRS value (50 year extrapolated value at 20° C.; 97.5 lower prediction limit) equal to or greater than 10.0 MPa corresponds to PE100 pressure rating. A PE80 pressure rating means the MRS was equal to or greater than 8.0 MPa and less than 10.0 MPa. The MRS of a pipe (2 inch nominal OD with a SDR of about 11.0) may be determined by performing extensive creep rupture testing at 23° C., 60° C. and at 80° C. and applying principles of the ISO 9080 extrapolation method. In an aspect, the BPECs disclosed herein may be fabricated into a PE80 pipe, PE100 pipe, or both.

In an aspect, a BPEC of this disclosure may display a pellet density of about 0.9509 g/cc, a MWD of about 13.1, and a HLMI of about 4.0 g/10 min. Such a composition may be fabricated into a PE pipe having an S4 critical temperature of about −30° C. and a Charpy Tdb of about −40° C.

Alternatively, a BPEC of this disclosure may display pellet density of about 0.9504 g/cc, a MWD of about 14, and a HLMI of about 10.32 g/10 min. Such a composition may be fabricated into a PE pipe having an ISO at 80° C. and 5.5 MPa of greater than about 2014 hours and a PENT at 2.4 MPa of about 448 hours.

Alternatively, a BPEC of this disclosure may display a pellet density of about 0.9516 g/cc, a MWD of about 15.2 and a HLMI of about 9.12 g/10 min. Such a composition may be fabricated into a PE pipe having an ISO at 80° C. and 5.5 MPa of greater than about 2014 hours and a PENT at 2.4 MPa of about 1660 hours.

EXAMPLES

For each of the following examples, the following metallocenes were evaluated either in combination or alone to determine their effect on polymer attributes, particularly rapid crack propagation and pipe strength. For convenience, the various metallocenes are set forth below with letter abbreviation:

The following testing procedures were used to evaluate the various polymers and compositions.

Melt index (MI, g/10 min) was determined in accordance with ASTM D 1238 condition F at 190° C. with a 2,160 gram weight.

High load melt index (HLMI, g/10 min) was determined in accordance with ASTM D 1238 condition E at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D 1505 and ASTM D 1928, procedure C.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta * (\omega)| = \frac{\eta_0}{[1 + (\tau_\eta \omega)^a]^{(1-n)/a}},$$

wherein:
 |η*(ω)|=magnitude of complex shear viscosity;
 $\eta_0$=zero shear viscosity;
 $\tau_\eta$=viscous relaxation time;
 a="breadth" parameter;
 n=fixes the final power law slope, fixed at 2/11 or zero as specified in the examples; and
 ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety. The CY "a" parameter is reported in the tables for the resins disclosed herein.

A "Quantachrome Autosorb-6 Nitrogen Pore Size Distribution Instrument" was used to determined specific surface area ("surface area") and specific pore volume ("pore volume"). This instrument was acquired from the Quantachrome Corporation, Syosset, N.Y.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8× 300mm) and were calibrated with a broad linear polyethylene standard (Chevron Phillips Chemical Company Marlex® BHB 5003 polyethylene) for which the molecular weight had been determined.

Molecular weight distributions and SCB branch profiles were obtained through size exclusion chromatography using an FTIR detector. Chromatographic conditions are those described above. However, the sample injection volume was 500 microliters. Samples were introduced to the FTIR detector via a heated transfer line and flow cell (KBr windows, 1 mm optical path, and ca. 70 μL cell volume). The temperatures of the transfer line and flow cell were kept at 143±1° C. and 140±1° C., respectively. Perkin Elmer FTIR spectrophotometer (PE 2000) equipped with a narrow band mercury cadmium telluride (MCT) detector was used in these studies.

All spectra were acquired using Perkin Elmer Timebase software. Background spectra of the TCB solvent were obtained prior to each run. All IR spectra were measured at 8 $cm^{-1}$ resolution (16 scans). Chromatograms were generated using the root mean square absorbance over the 3000-2700 $cm^{-1}$ spectral region (i.e., FTIR serves as a concentration detector). Molecular weight calculations were made as previously described using a broad molecular weight polyethylene (PE) standard [see Jordens K, Wilkes G L, Janzen J, Rohlfing D C, Welch M B. Polymer 2000; 41:7175]. Spectra from individual time slices of the chromatogram are subsequently analyzed for comonomer branch levels using chemometric techniques. All calibration spectra were taken at sample concentrations which far exceeded that needed for good signal to noise (i.e., >0.08 mg /mL at the detector).

SCB determination was made as follows. Narrow molecular weight ($M_w/M_n$ ~1.1 to 1.3), solvent gradient fractions of ethylene 1-butene, ethylene 1-hexene, polyethylene homopolymers, and low molecular weight alkanes were used in calibration and verification studies. The total methyl content of these samples ranged from 1.4 to 82.7 methyls per 1000 total carbons. Methyl content of samples was calculated from $M_n$ or measured using C-13 NMR spectroscopy. C-13 NMR spectra were obtained on 15 wt. % samples in TCB using a 500 MHz Varian Unity Spectometer run at 125° C. as previous described [see Randall J C, Hsieh E T, NMR and Macromolecules; Sequence, Dynamic, and Domain Structure, ACS Symposium Series 247, J. C. Randall, Ed., American Chemical Society, Washington D.C., 1984.]. Methyl content per 1000 carbons by NMR was obtained by multiplying (X 1000) the ratio of total methyl signals to total signal intensity.

A partial least squares (PLS) calibration curve was generated using Pirouette chemometric software (Infometrix) to correlate changes in the FTIR absorption spectra with calculated or NMR measured values for methyls/1000 total carbons for the 25 samples. The FTIR absorption spectra used in the calibration model were made from co-added spectra collected across the whole sample. Only a portion of the spectral region (2996 and 2836 $cm^{-1}$) was used in the calibration step in order to minimize the effects of residual solvent absorption. Preprocessing of spectral data included area normalization, taking the first derivative of the spectra and mean centering all data.

A four component calibration model was calculated and optimized using the process of cross validation (RSQ=0.999, SEV=0.7). The calibration model was verified using 23 additional samples. The predicted versus actual values for the validation data showed excellent correlation (RSQ=0.987) and exhibited a root mean square error of prediction equal to ±0.4 methyl groups per 1000 total carbon molecules.

SCB levels were calculated by subtracting out methyl chain end contributions. The amount of methyl chain ends were calculated using the equation $Me_{ce}=C(2-V_{ce})/M$, where $Me_{ce}$ is the number of methyl chain ends per 1000 total carbon molecules, C is a constant equal to 14000, $V_{ce}$ is the number of vinyl terminated chain ends (1 for chromium catalyzed resins), and M is the molecular weight calculated for a particular slice of the molecular weight distribution.

Example 1

Alumina A, from W.R. Grace Company, was impregnated to incipient wetness with an aqueous solution of ammonium sulfate. Typically, the alumina had a surface area of about 330 $m^2$/gram and a pore volume of about 1.3 cc/gram. The amount of ammonium sulfate used was equal to 20% of the starting alumina. The volume of water used to dissolve the ammonium sulfate was calculated from the total pore volume of the starting sample (i.e. 2.6 mLs of water for each gram of alumina to be treated). Thus, a solution of about 0.08 grams of ammonium sulfate per mL of water was employed. The resulting wet sand was dried in a vacuum oven overnight at 120° C., and then screened through a 35 mesh screen. Finally, the material was activated in a fluidizing stream of dry air at 550° C. for 3 hours, in the case of bench scale samples, or 6 hours, for the larger pilot plant samples. The samples were then stored under nitrogen.

Example 2

The metallocenes used in the various examples were purchased or prepared as follows. While certain preparations are set forth herein, it should be understood that the metallocenes used in accordance with this invention can be prepared using numerous techniques. Several techniques are described in U.S. patent application Ser. No. 10/876,948, now U.S. Pat. No. 7,064,225 issued Jun. 20, 2006 and entitled "Improved-Synthesis Of Ansa-Metallocenes And Their Parent Ligands In High Yield," incorporated by reference herein in its entirety. Also, metallocene compounds can be prepared as described in U.S. patent application Ser. Nos. 10/876,891, filed on Jun. 25, 2004 and published as U.S. 2005-0288461A1 and 10/876,930, now U.S. Pat. No. 7,148,298 issued on Dec. 12, 2006 and both entitled "Polymerization Catalysts For Producing Polymers With Low Levels Of Long Chain Branching," U.S. patent application Ser. No. 11/208,077, now U.S. Pat. No. 7,226,886, issued on Jun. 5, 2007 and entitled "Polymerization Catalysts and Process for Producing Bimodal Polymers in a Single Reactor," and U.S. patent application Ser. No. 11/209,006, filed Aug. 22, 2005, published as U.S. 2007-0043176 A1 and entitled "Polymerization Catalysts And Process For Producing Bimodal Polymers In A Single Reactor," the disclosures of which are incorporated by reference herein in their entirety.

All manipulations involving air-sensitive reagents and materials were performed under nitrogen by using standard Schlenk line or dry box techniques. The solvent THF was distilled from potassium, while anhydrous diethyl ether, methylene chloride, pentane, and toluene (Fisher Scientific Company) were stored over activated alumina. All solvents were degassed and stored under nitrogen. Zirconium (IV) chloride (99.5%) and n-butyllithium were purchased from Aldrich Chemical Company and were used as received. Products were analyzed by $^1$H NMR (300 MHz, CDCl$_3$, referenced against residual CHCl$_3$ peak at 7.24 ppm) or $^{13}$C NMR (75 MHz, CDCl$_3$, referenced against central line of CDCl$_3$ at 77.00 ppm).

2,7-di-tert-butylfluorene was prepared according to the procedure in *Bull. Chem. Soc. Jpn.*, 1986, 59, 97-103.

Metallocene I: Bis(indenyl)zirconium dichloride was purchased from Witco (Eurecen 5032).

Metallocene C: Phenyl-3-butenylmethylidene($\eta^5$-cyclopentadienyl)($\eta^5$-9-2,7-di-tert-butylfluorenyl)zirconium dichloride was prepared as follows. A solution of 42.3 g (152 mmoles) of 2,7-di-t-butylfluorene in 150 mLs of dry, degassed THF was cooled in dry ice. A solution of n-butyl lithium in hexanes, 61 mLs of 2.5 M (152 mmoles) was added dropwise over 30 minutes. The bath was then removed. After stirring for an additional 90 minutes, this solution was added to 38 g (167 mmoles) of 6-phenyl-6-(3-butenyl)fulvene in 100 mLs of THF while cooling in an ice bath. The addition took 1½ hours. The mixture was allowed to warm while stirring for about 120 hours.

While cooling in a water bath, a solution of 6 g of ammonium chloride in 100 mLs of water was added followed by 100 mLs of heptane. The layers were separated and the organic layer was washed with 3×100 mLs of water, filtered, and dried over sodium sulfate. The solvent was stripped off and the product was crystallized from a minimal heptane and washed with methanol before drying.

A portion of the ligand from above, 20.0 g (41.3 mmoles) was dissolved in diethylether and cooled in dry ice. A hexanes solution of n-butyl lithium, 33 mLs of 2.5 M (82.5 mmoles), was added over 0.5 hour. The bath was removed and the orange slurry was stirred overnight. This slurry was then added to a slurry of 10.1 g (43.3 mmoles) of zirconium (IV) chloride in 200 mLs of n-pentane cooled in ice water. The bath was removed and the slurry was stirred for 5 days and then the slurry was filtered through sodium sulfate. The solid was washed with pentane and then extracted with methylene chloride. The solution was taken to dryness to yield 21.5 g of orange solid (80%).

Metallocene N: Zr$\{\eta^5$-C$_5$H$_4$—[(CH$_2$)$_3$CH$_3$]$\}\{\eta^5$-C$_9$H$_6$-1-(CH$_2$CH=CH$_2$)$\}$Cl$_2$ was prepared as follows. A 500 mL Schlenk flask was charged with nBuCpZrCl$_3$ (20.0 g, 62.7 mmol) and approximately 400 mL of diethyl ether. The resulting slurry was cooled to 0° C., after which time (10.7 g, 66.0 mmol) of Li[(C$_9$H$_6$)-1(allyl)] was cannulated as an ethereal solution. The reaction mixture was stirred overnight at ambient temperature and the solvent was removed in vacuo. The resulting solid was dissolved in toluene and centrifuged to remove LiCl. Removal of solvent in vacuo yielded a yellow-brown solid, which was dissolved in a dichloromethane/pentane mixture and was cooled to −35° C. for a couple of hours. Resulting slurry was filtered, and the precipitate was dried under reduced pressure (0.1 mm, 1 h) to yield the product as a yellow solid (17.0 g, 62%). $^1$H NMR (CDCl$_3$, δ) 0.87 (t, J=7.2 Hz, CH$_3$), 1.50-1.22 (m, CH$_2$(CH$_2$)$_2$CH$_3$), 2.58-2.42 (m, CH$_2$(CH$_2$)$_2$CH$_3$), 3.77-3.62 (m, CH$_2$=CHCH$_2$), 5.10-5.02 (m, CH$_2$=CHCH$_2$), 5.78-5.76 (m, 1, C$_5$H$_4$), 5.87-5.83(m, 2, C$_5$H$_4$), 5.99-5.91 (m, CH$_2$=CHCH$_2$), 6.04-6.00 (m, 1, C$_5$H$_4$), 6.39-6.37 (m, 1, C$_9$H$_6$), 6.63 (d, J=3.0 Hz, 1, C$_9$H$_6$), 7.28-7.18 (m, 2, C$_9$H$_6$), 7.60-7.56(m, 2, C$_9$H$_6$).

Example 3

Bench Scale polymerization was performed in a 1 gallon Autoclave Engineers reactor. Solutions of Phenyl-3-butenyl-methylidene($\eta^5$-cyclopentadienyl)($\eta^5$-9-2,7-di-tert-butylfluorenyl)-zirconium dichloride were made at 1 mg/mL in toluene and used as follows. To a Wheaton bottle containing 58 mg of sulfated chemically treated solid oxide (CTSO sulfated with H$_2$SO$_4$), 45 mLs of dry heptane were added followed by the specified amount of either 25wt. % TIBAL (triisobutylaluminum) or 19 wt. % TNBAL (tri-n-butylaluminum) and then 1 mg (1 mL of solution) of metallocene in toluene. After contacting for 15 min, the slurry was charged to a dry autoclave under isobutane purge. Following addition of 2 Liters of isobutane, the slurry was stirred while raising the temperature to the set point. Once the temperature was within 5 degrees of the set point, ethylene was added and fed on demand during the run to maintain the desired total pressure. At the end of each run, volatiles were vented from the reactor and the dry product was removed. During the polymerization no hexene or hydrogen were added. Polymerization at 100° C. was conducted at 447 psig total pressure, while at 90° C. the total pressure was 390 psig, or about 14 mole % ethylene in each case.

TABLE 1

Bench Scale Polymerization

| Run No. | Time (min) | Temp. (C.) | R$_3$Al (mmoles) | Solid PE (g) | Productivity (g/g) | Metallocene Activity (g/g/hr) | CTSO Activity (g/g/hr) |
|---|---|---|---|---|---|---|---|
| 1 | 60 | 100 | TnBAL, 0.27 | 451.9 | 451900 | 451900 | 7791 |
| 2 | 60 | 100 | TnBAL, 0.54 | 427.8 | 427800 | 427800 | 7376 |
| 3 | 60 | 100 | TnBAL, 0.54 | 380.0 | 380000 | 380000 | 6552 |
| 4 | 60 | 100 | TnBAL, 0.80 | 284.0 | 284000 | 284000 | 4897 |
| 5 | 60 | 90 | TIBAL, 0.69 | 136.4 | 136400 | 136400 | 2352 |
| 6 | 60 | 90 | TnBAL 0.13 | 70.0 | 70000 | 70000 | 1207 |
| 7 | 30 | 90 | TnBAL, 0.27 | 180.0 | 180000 | 360000 | 6207 |
| 8 | 60 | 90 | TnBAL, 0.54 | 277.0 | 277000 | 277000 | 4776 |
| 9 | 60 | 90 | TnBAL, 1.07 | 315.0 | 315000 | 315000 | 5431 |

Productivity is grams of polyethylene produced per gram of metallocene. Metallocene activity is grams of polyethylene produced per gram of metallocene per hour. CTSO activity is grams of polyethylene produced per gram of CTSO per hour.

TABLE 2

Bench Scale Polymer Properties

| Run No | $M_n$/1000 (g/mol) | $M_w$/1000 (g/mol) | $M_z$/1000 (g/mol) | $M_w/M_n$ | CY-a a_eta | n_eta | Measurement T(° C.) |
|---|---|---|---|---|---|---|---|
| 1 | 123.76 | 305.99 | 609.6 | 2.47 | 0.4404 | 0.0000 | 190 |
| 2 | 131.52 | 335.37 | 686.5 | 2.55 | 0.4363 | 0.0000 | 190 |
| 3 | 145.78 | 357.93 | 726.8 | 2.46 | 0.4445 | 0.0000 | 190 |
| 4 | 171.17 | 400.5 | 802.7 | 2.34 | 0.4428 | 0.0000 | 190 |
| 5 | 259.25 | 648.62 | 1410.9 | 2.5 | 0.4130 | 0.0000 | 190 |
| 6 | 244.62 | 672.06 | 1459 | 2.75 | 0.4076 | 0.0000 | 190 |
| 7 | 184.01 | 520.59 | 1115.9 | 2.83 | 0.4010 | 0.0000 | 190 |
| 8 | 337.03 | 878.03 | 1922.9 | 2.61 | 0.3941 | 0.0000 | 190 |
| 9 | 236.56 | 633.29 | 1288.9 | 2.68 | 0.4245 | 0.0000 | 190 |

The data in Table 2 show that polymers produced with metallocene C have very narrow molecular weight distributions, with $M_w/M_n$ generally <3. The Carreau-Yasuda a parameter, CY-a, is generally greater than 0.4, further illustrating the limited "rheological breadth" due to the narrow MWD and low levels of long chain branching.

Figure 1:
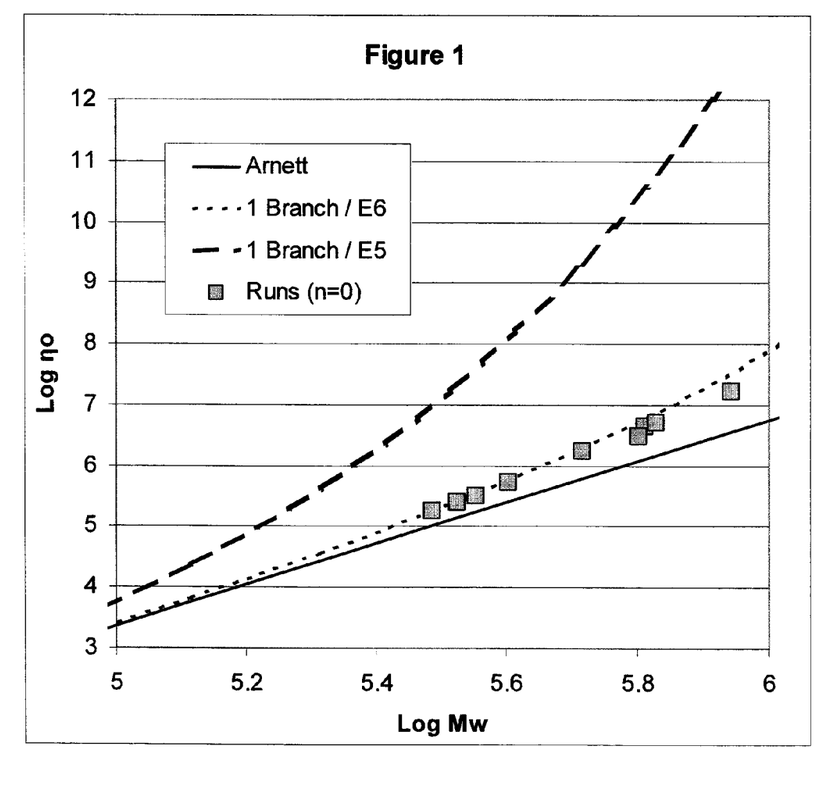
FIG. 1 presents a graph of zero shear viscosity as a function of weight average molecular weight.

FIG. 1 illustrates the linearity of the resins obtained from catalyst C when run alone. The Arnett line represents the expected dependence of zero shear viscosity for linear polymers when plotted against the weight average molecular weight. The other lines describe the expected zero shear viscosity for polyethylene containing either 1 long chain branch/100,000 total carbons or 1 long chain branch/1,000,000 total carbons as derived from the Colby-Janzen model for long chain branching. Clearly, this catalyst system produces very low levels of long chain branching and pipe resins produced from it will contain very low levels of long chain branching. Furthermore, long chain branches in the longest molecules have the strongest effect on the rheology of the polymer. Therefore, the detrimental effects of long chain branching are minimal.

Example 4

Metallocene I: Under nitrogen, 1.00 g of solid metallocene I, bis(indenyl)dichlorozirconium, was slurried in 30 mL of hexene-1, followed by addition of 25 grams of neat (93%) triethylaluminum. This solution was diluted with 200 to 300 grams of n-heptane and transferred to a steel vessel. Isobutane was added to obtain a total of 40 pounds of solution.

Metallocene C: Under nitrogen, 2.00 g of solid metallocene C, 1-(phenyl)-1-(3-butenyl)-1-(cyclopentadienyl)-1-(2,7-di-tert-butylfluorenyl)methane zirconium dichloride, was slurried in about 200 mL of hexene-1, followed by addition of 25 grams of neat (93%) triethylaluminum. This solution was diluted with 100 to 240 grams of n-heptane and transferred to a steel vessel. Isobutane was added to obtain a total of 40 pounds of solution.

Metallocene N: Under nitrogen, 2.00 g of solid metallocene N, n-butyl-(cyclopentadienyl)-1-allyl-(indenyl) zirconium dichloride, was dissolved in 420 mL of toluene. This solution was transferred to a steel vessel and isobutane was added to obtain a total of 40 pounds of solution.

Example 5

Pilot plant polymerizations were conducted in a 23-gallon slurry loop reactor at a production rate of approximately 25 pounds of polymer per hour. Polymerization runs were carried out under continuous particle form process conditions in a loop reactor (also known as a slurry process) by contacting a metallocene solution in isobutane and a small amount of toluene, triethylaluminum, and a solid activator in a 2 L stirred autoclave with continuous output to the loop reactor.

The precontacting was carried out in the following manner. Triethylaluminum solution and metallocene solutions in isobutane were fed as separate streams into a tee upstream of the autoclave where they contacted each other. The solid activator was flushed with isobutane into a tee between the aforementioned tee and the autoclave, contacting the triethylaluminum/metallocene mixture just before entering the autoclave. The isobutane flush used to transport the solid activator into the autoclave was set at a rate that would result in a residence time of approximately 25 minutes in the autoclave. The total flow from the autoclave then entered the loop reactor.

Ethylene used was polymerization grade ethylene (obtained from Union Carbide Corporation) which was purified through a column of alumina and activated at 250° C. (482° F.) in nitrogen. 1-Hexene, when used, was polymerization grade 1-hexene (obtained from Chevron Chemicals Company) which was purified by nitrogen purging and storage over 13-X molecular sieve activated at 250° C. (482° F.) in nitrogen. The loop reactor was a liquid full, 15.2 cm diameter, loop reactor, having a volume of 23 gallons (87 liters). Liquid isobutane was used as the diluent. Some hydrogen was added to regulate the molecular weight of the low molecular weight component of the polymer product. The isobutane was polymerization grade isobutane (obtained from Chevron Phillips Chemical Company, Borger, Tex.) that was further purified by distillation and subsequently passed through a column of alumina [activated at 250° C. (482° F.) in nitrogen].

Reactor conditions included a pressure around 580 psi (4 MPa), and a temperature that was varied from about 90° C. (194° F.) to about 99° C. (210° F.) as indicated in Table 3.

Also, the reactor was operated to have a residence time of 1.25 hours. The solid activator was added through a 0.35 cc circulating ball-check feeder and fed to the 2-Liter autoclave as described above. Metallocene concentrations in the reactor were within a range of about 1 to 2 parts per million (ppm) of the diluent in the polymerization reactor. Polymer was removed from the reactor at the rate of about 25 lbs per hour and recovered in a flash chamber. A Vulcan dryer was used to dry the polymer under nitrogen at about 60-80° C. (140-176° F.).

Cocatalyst triethylaluminum (TEA) (obtained from AKZO Corporation) or tri-n-butylaluminum (TnBAL) (obtained from Albermarle) was also used. The cocatalyst was obtained as a 10 wt. % solution in heptane, but was further diluted to 1 weight percent. The cocatalyst was added in a concentration in a range of from about 8 to 120 parts per million of the diluent in the polymerization reactor. To prevent static buildup of the reactor, a small amount (less than 5 ppm, by weight, of diluent) of a commercial antistatic agent sold as "Stadis 450" was usually added.

Various resins were prepared according to the above procedure, as specified in Table 3. Table 4 presents a summary of the results.

For run 14, the second portion of aluminum alkyl (TNBAL) was fed directly to the reactor. In addition, a 500 mL precontactor was used, rather than the 2 Liter vessel.

TABLE 3

Process Conditions for Various Experimental Runs.

| | (1) Run No. | | | | | | |
|---|---|---|---|---|---|---|---|
| (2) Activator-Support | 10 Sulfated alumina | 11 Sulfated alumina | 12 Sulfated alumina | 13 Sulfated alumina | 14 Sulfated alumina | 15 Sulfated alumina | 16 Sulfated alumina |
| Metallocene | C + I | C + I | C + I | C + I | C + I | C + N | C + N |
| Metallocene to Reactor (ppm) | 0.95 + 0.56 | 1.38 + 0.39 | 1.37 +0.40 | 1.30 + 0.41 | 1.28 + 0.41 | 1.17 + 0.97 | 1.46 + 0.73 |
| Autoclave Residence Time (Min) | 22.86 | 22.26 | 22.54 | 22.80 | 22.66 | 14.53 | 9.17 |
| Cocatalyst Type | TEA | TEA | TEA | TEA | TEA | TnBAL | TnBAL |
| Cocatalyst (ppm) | 9.41 | 10.05 | 9.75 | 9.69 | 9.45 | 35 + 75 | 24.67 |
| Rx Temp (° C.) | 98.7 | 89.9 | 89.9 | 89.9 | 89.9 | 90.0 | 90.0 |
| Ethylene (mol %) | 12.50 | 18.54 | 19.32 | 19.40 | 17.91 | 14.25 | 14.80 |
| 1-hexene (mol %) | 0.37 | 0.24 | 0.24 | 0.24 | 0.25 | 0.47 | 0.51 |
| C6=/C2= (Mole Ratio) | 0.03 | 0.01 | 0.01 | 0.01 | 0.01 | 0.03 | 0.03 |
| $H_2$ (mlb/hr) | 4.5 | 3.5 | 3.5 | 3.5 | 3.5 | 3.8 | 4.0 |
| C2 = Feed Rate (lb/hr) | 24.51 | 26.59 | 26.56 | 26.59 | 26.67 | 30.3 | 30.41 |
| 1-Hexene Feed Rate (lb/hr) | 0.52 | 0.94 | 0.93 | 0.91 | 0.95 | 0.44 | 0.60 |
| Total iC4 Flow Rate (lb/hr) | 52.68 | 53.14 | 53.14 | 52.74 | 53.25 | 63.72 | 63.03 |
| Solids Conc. wt. % | 23.70 | 22.50 | 22.10 | 21.70 | 23.00 | 24.80 | 25.10 |
| Polymer Production (lb/hr) | 18.78 | 18.48 | 18.11 | 17.75 | 18.89 | 23.92 | 24.00 |
| Density (pellets) (g/cc) | 0.9504 | 0.9516 | 0.9520 | 0.9528 | 0.9490 | 0.9509 | 0.9497 |
| HLMI | 10.32 | 9.12 | 14.87 | 11.65 | 7.93 | 4.0 | 4.24 |
| Melt Index (MI) | 0.20 | 0.10 | 0.07 | 0.11 | 0.07 | 0.06 | 0.08 |
| HLMI/MI | 52 | 91 | 212 | 106 | 113 | 67 | 53 |

TABLE 4

Summary of Results

| Run No. | Metallocene Type (Ratio) | Reactor Temp (° C.) | Pellet HLMI (dg/10 min) | Pellet density (g/cc) | $M_w$ ($\times 10^{-3}$) | $M_w/M_n$ | S4 Critical Temperature (° C.) | ISO 80° C. @5.5 Mpa (hours) | Charpy $T_{db}$ (° C.) | Pent (hrs) (2.4 Mpa) |
|---|---|---|---|---|---|---|---|---|---|---|
| 10 | C + I (1.7) | 98.7 | 10.32 | 0.9504 | 190 | 14 | | >2014 | | 448 |
| 11 | C + I (3.5) | 89.9 | 9.12 | 0.9516 | 247 | 15.2 | | >2014 | | 1660 |
| 12 | C + I (3.4) | 89.9 | 14.87 | 0.952 | 243 | 15.3 | | >1966 | | 885 |
| 13 | C + I (3.2) | 89.9 | 11.65 | 0.9528 | — | — | | >1966 | | 1838 |
| 14 | C + I (3.1) | 89.9 | 7.93 | 0.9490 | 260 | 14.6 | | | | 3349 |
| 15 | C + N (1.2) | 90.0 | 4.00 | 0.9509 | 261 | 13.1 | −30 | | −40 | 613 |

TABLE 4-continued

Summary of Results

| Run No. | Metallocene Type (Ratio) | Reactor Temp (°C.) | Pellet HLMI (dg/10 min) | Pellet density (g/cc) | $M_w$ (×10$^{-3}$) | $M_w/M_n$ | S4 Critical Temperature (°C.) | ISO 80° C. @5.5 Mpa (hours) | Charpy $T_{db}$ (°C.) | Pent (hrs) (2.4 Mpa) |
|---|---|---|---|---|---|---|---|---|---|---|
| 16 | C + N (2.0) | 90.0 | 4.24 | 0.9497 | 239 | 9.89 | | | −40 | |
| 17 | Comparative | — | | 0.950 | — | — | −24 | | −35 | |

Run 17 is commercially available H516N HDPE made by Chevron Phillips Chemical Company.

TABLE 5

Resin Deconvolution

| Run 14 SEC | % | $M_n/1000$ (g/mol) | $M_w/1000$ (g/mol) | $M_z/1000$ (g/mol) | $M_v/1000$ (g/mol) | $M_p/1000$ (g/mol) | Log $M_p$ | $M_w/M_n$ | IB | IVc |
|---|---|---|---|---|---|---|---|---|---|---|
| Bimodal (exp.) | 100 | 15.69 | 212.35 | 732.4 | 164.56 | 306.67 | 5.486671293 | 13.53 | 1.956 | 2.419 |
| Bimodal (fit) | 100 | 15.81 | 232.99 | 819.9 | 179.67 | 340.13 | 5.531644939 | 14.74 | 1.998 | 2.578 |
| LMW Component (calc from fit) | 53.779316 | 8.79 | 29.33 | 68.4 | 25.68 | 20.77 | 4.317436497 | 3.34 | 1.174 | 0.628 |
| HMW Component (calc from fit) | 46.220684 | 227.96 | 470.04 | 874.5 | 428.8 | 340.13 | 5.531644939 | 2.06 | 0.929 | 4.849 |
| $M_w$(HMW)/$M_w$(LMW) | | | | 16.0 | | | | | | |

| Data from peak fit | Mp | FWHM | R | R = 2($M_P$2 − $M_P$1)/(FWHM1 + FWHM2) |
|---|---|---|---|---|
| LMW Component (fit) | 4.327586 | 1.0987226 | | |
| HMW Component (fit) | 5.544278 | 0.8726591 | | |
| Blend | | | 1.234355 | |

| Run 16 SEC | % | $M_n/1000$ (g/mol) | $M_w/1000$ (g/mol) | $M_z/1000$ (g/mol) | $M_v/1000$ (g/mol) | $M_p/1000$ (g/mol) | Log $M_p$ | $M_w/M_n$ | IB | IVc |
|---|---|---|---|---|---|---|---|---|---|---|
| Bimodal (exp.) | 100 | 25.76 | 255.45 | 759.9 | 206.01 | 427.41 | 5.630844679 | 9.92 | 1.784 | 2.848 |
| Bimodal (fit) | 100 | 22 | 233.77 | 680.7 | 188.7 | 382.71 | 5.58286981 | 10.63 | 1.817 | 2.672 |
| LMW Component (calc from fit) | 56.334044 | 12.86 | 50.44 | 120 | 43.77 | 37.62 | 4.575418791 | 3.92 | 1.25 | 0.925 |
| HMW Component (calc from fit) | 43.665956 | 263.1 | 470.29 | 758.3 | 438.21 | 382.71 | 5.58286981 | 1.79 | 0.82 | 4.926 |
| $M_w$(HMW)/$M_w$(LMW) | | | | 9.3 | | | | | | |

| Data from peak fit | $M_p$(g/mol) | FWHM | R | R = 2($M_P$2 − $M_P$1)/(FWHM1 + FWHM2) |
|---|---|---|---|---|
| LMW Component (fit) | 4.578048 | 1.1675113 | | |
| HMW Component (fit) | 5.599065 | 0.7676319 | | |
| Blend | | | 1.055237 | |

FWHM = Full width at half peak max
R = peak resolution

The deconvolution of resins from Runs 14 and 16, as shown in Table 5, demonstrates that the two components are well separated in molecular weight, as seen from the ratio of the weight average molecular weight of the high molecular weight component divided by the weight average molecular weight of the low molecular weight component. The table also provides further evidence that the high molecular weight component has a narrow molecular weight distribution (MWD), $M_w/M_n<3$. The MWD of the low molecular weight component is slightly broader.

TABLE 6

Comonomer Levels in Component Peaks by SEC-FTIR

| Run No. | High Molecular Weight Peak SCB/1000 Total C | Low Molecular Weight Peak SCB/1000 Total C | Ratio (High/Low) |
|---|---|---|---|
| 10 | 1.20 | 0.42 | 2.88 |
| 11 | 0.69 | 0.19 | 3.62 |
| 12 | 1.59 | 0.63 | 2.53 |
| 13 | 1.30 | 0.43 | 3.03 |
| 14 | 1.74 | 0.83 | 2.09 |

The data in Table 6 show that the hexene comonomer has preferentially been placed in the high molecular weight component, as shown from the ratio of the number of short chain branches/1000 total carbons found in each component. The high molecular weight component contains more than twice as many short chain branches.

Without further elaboration, it is believed that one skilled in the art can, using the description herein, utilize the present invention to its fullest extent. While aspects of the invention have been shown and described, modifications thereof can be made by one skilled in the art without departing from the spirit and teachings of the invention. The aspects and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

The invention claimed is:

1. A multimodal polyethylene composition having at least a first polyethylene component and a second polyethylene component, wherein:
   (a) the first polyethylene component and the second polyethylene component have a molecular weight distribution of equal to or less than 5;
   (b) the first polyethylene component has a higher molecular weight than the second polyethylene component;
   (c) the first polyethylene component has an "a" parameter value of equal to or greater than about 0.35 when fitted to the Carreau-Yasuda equation with n=0;
   (d) the ratio of the weight average molecular weight of the first polyethylene component to the weight average molecular weight of the second polyethylene component is between 9 and 20;
   (e) the S4 critical temperature of the composition is less than about −20° C.;
   (f) the density of the composition is from about 0.920 g/cc to about 0.965 g/cc;
   (g) the first polyethylene component comprises a copolymer of ethylene and 1-olefin and the second polyethylene component comprises a copolymer of ethylene and 1-olefin, and wherein the 1-olefin in the first polyethylene component and the second polyethylene component may be the same or different;
   (h) the polydispersity of the composition is from about 3.0 to about 30; and
   (i) the high load melt index of the composition is equal to or less than about 30 g/10 min.

2. The composition of claim 1 wherein the first polyethylene component contains equal to or less than about one long chain branch per about 10,000 carbons.

3. The composition of claim 1 wherein the ratio of short chain branching in the first polyethylene component to short chain branching in the second polyethylene component is equal to or greater than about 1.

4. The composition of claim 1 wherein the 1-olefin is 1-hexene in the first polyethylene component and the second polyethylene component.

5. The composition of claim 1 wherein the amount of 1-olefin in the first polyethylene component is equal to or greater than about 1.5 times the amount of 1-olefin in the second polyethylene component.

6. The composition of claim 1 wherein the first polyethylene component is prepared by a first metallocene catalyst, the second polyethylene component is prepared by a second metallocene catalyst, and the first and second metallocene catalysts are not the same.

7. The composition of claim 1 wherein the weight ratio of first polyethylene component to second polyethylene component is equal to or greater than about 0.5.

8. The composition of claim 1 having a molecular weight distribution of greater than about 6.

9. The composition of claim 1 having a 23° C. notched Charpy impact energy of greater than about 0.7 Joules per ASTM F 2231.

10. The composition of claim 1 having a Charpy ductile to brittle critical temperature of equal to or less than about −25° C. per ASTM F 2231.

11. The composition of claim 1 having a PENT of greater than about 1500 hours per ASTM F 1473.

12. A PE80 or PE100 pipe comprising the multimodal polyethylene composition of claim 1.

13. A pipe comprising the multimodal polyethylene composition of claim 1 and having a long term hydrostatic strength equal to or greater than 1000 hours per ASTM D 2837.

14. A method of making the pipe of claim 12 comprising extruding the multimodal polyethylene composition to form the pipe.

* * * * *